June 18, 1963

A. J. HOROWITZ 3,094,187

COLLAPSIBLE MOTORIZED CART

Filed April 14, 1961

Inventor:
Arnold J. Horowitz
By Silverman, Mullin & Cass
Attorneys

June 18, 1963     A. J. HOROWITZ     3,094,187
COLLAPSIBLE MOTORIZED CART
Filed April 14, 1961     2 Sheets-Sheet 2
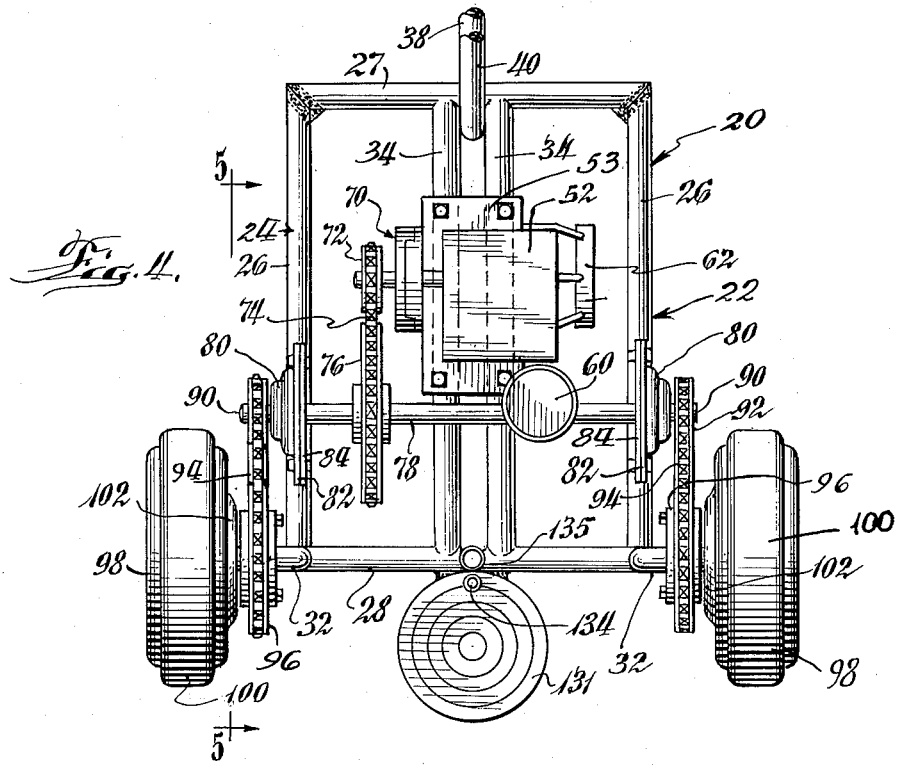
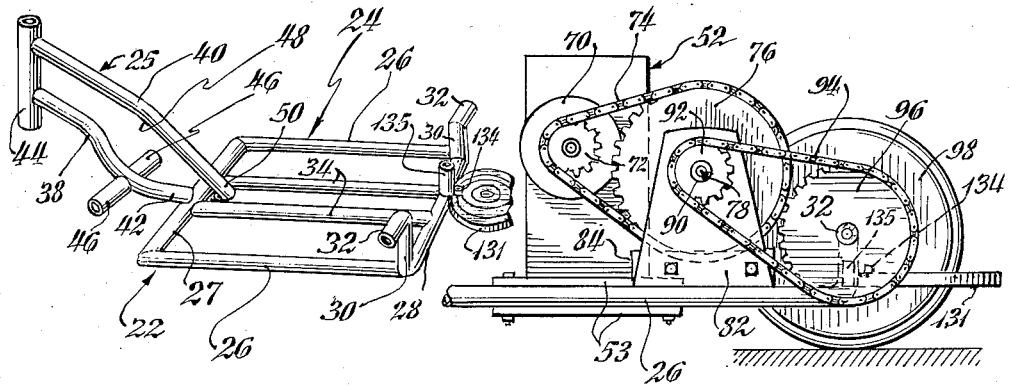
Inventor:
Arnold J. Horowitz
By Silverman, Mullin & Cass
Attorneys.

United States Patent Office 3,094,187
Patented June 18, 1963

3,094,187
COLLAPSIBLE MOTORIZED CART
Arnold J. Horowitz, 6436 N. Greenview Ave.,
Chicago, Ill.
Filed Apr. 14, 1961, Ser. No. 103,149
3 Claims. (Cl. 180—27)

This invention relates generally to motor vehicles and more particularly, relates to improvements in a collapsible motorized cart utilizing a relatively small horsepower internal combustion engine which is characterized by a more compact, lightweight and economical construction than has been available heretofore.

Although not necessarily limited thereto, the motorized cart embodying the invention is especially useful as a golf cart for carrying a player and his golf equipment as he plays his round of golf. In recent years, many attempts have been made to produce a sufficiently compact, lightweight and economical vehicle for this as well as other uses, but without entirely satisfactory results. The terrain of most golf courses is irregular and hilly and some golf courses have steep grades as much as forty-five degrees. The fairways are resilient and soft. In order to carry the player and equipment safely, the golf cart must be sufficiently strong, powerful and stable even on steeply graded terrain. Consequently, previous vehicles of this general character have been relatively heavy, four-wheel chassis structures which were neither compact nor collapsible to a desirable extent. Also, they have been expensive to manufacture so that in the main, such motorized golf carts have been rented to players by the golf courses at quite dear rental rates per round of play. The safety factor which was required to be built into previous motor vehicles of this type necessitated the use of sturdy and heavy welded steel frames and four-wheel chassis at the sacrifice of compactness, economy of manufacture and lightweight construction.

The herein invention provides a motorized cart which succeeds for the first time to obviate the disadvantages of prior motorized vehicles of this general character. The motorized cart embodying the invention is sufficiently compact and collapsible to permit same to be carried in the trunk compartment of most conventional stock cars and of many of the so-called compact cars so much in vogue. It is sufficiently lightweight in construction to permit one person to lift the vehicle for placement in the trunk compartment. It is collapsible to the extent necessary to permit the lid of the trunk compartment to be closed and it is adequately sturdy, powerful and stable to assure complete safety even over steep grades. In conjunction with all of these desirable attributes, the motorized cart embodying the invention is highly economical to manufacture and operate to a more significant degree than has been achieved heretofore. In fact, because of the significant economies realized in the manufacture of this vehicle, the cost thereof will lie within the realm of purchase by most golfers so that the high cost of rental of heretofore available carts can be avoided. In addition, the vehicle may be used for other purposes, as will be explained, when not being used as a golf cart.

Consequently, it is a major object of the invention to provide a collapsible, motorized vehicle of the character described which is characterized by a construction which enables the desirable advantages for such a vehicle as enumerated above, as well as others, to be realized.

An important object of the invention is to provide a motorized vehicle of the character described having a novel welded frame construction and a wheel drive system which provides for great stability over surfaces inclined as much as forty-five degrees relative to horizontal when the vehicle is driven loaded.

Another object of the invention is to provide a motorized vehicle of the character described which is especially adapted for use as a small auxiliary vehicle in limited areas in addition to its use as a golf cart. In this respect, the motorized vehicle embodying invention is capable of being used, with very minor modifications and adaptations, also for pulling a lawn-mowing apparatus, a small wagon or the like.

Another object of the invention is to provide a motorized vehicle of the character described which is economical to manufacture, which is light in weight, which is readily portable, and which is highly compact. Other objects of the invention reside in the provision of such a vehicle which is adequately powered to permit all of the uses enumerated therefor, as well as others, carrying a full grown adult; which is simple and easy to operate and maneuver; which is safe to operate, even by children; and which is quiet and efficient to operate with equal versatility and advantage in all of the uses to which the invention can be put.

The foregoing and other advantages of the invention will become apparent as the description thereof evolves. A preferred embodiment of the invention has been described in detail in the specification and illustrated in the accompanying drawings. It is contemplated that minor variations in the size, arrangement, construction and proportion of the several parts of the invention may occur to the skilled artisan without departing from the scope of sacrificing any of the advantages thereof.

In the drawings:

FIG. 1 is a side elevational view of the motor vehicle embodying the invention, said vehicle being shown in solid outline for use as a golf cart and a wagon attachment for said vehicle being shown in broken outline to illustrate one of the different uses to which the said vehicle can be put.

FIG. 2 is a rear elevational view of the motor vehicle of the invention.

FIG. 3 is a sectional view taken through said motor vehicle along the line 3—3 of FIG. 2 and in the general direction indicated.

FIG. 4 is a fragmentary top plan view of the motor vehicle with portions removed to show the portions of the frame construction of the said vehicle.

FIG. 5 is a fragmentary sectional view taken along the line 5—5 of FIG. 4 and in the general direction indicated.

FIG. 6 is a perspective view of the chassis or frame of the said vehicle.

Referring now to the drawings, the motorized cart or vehicle embodying the invention is designated generally by the reference character 20 in FIG. 1. Said vehicle 20 is supported on a chassis designated generally by the reference character 22 in FIG. 6 which is formed of tubular metal members interconected as by welding. The chassis 22 is comprised of a substantially rectangular open frame 24 horizontally disposed at the rear portion of the vehicle and a second frame 25 rigidly connected substantially at right angle to the forward end of the frame 24. Generally, the chassis 22 is an elongate, compact structure providing a very low center of gravity for the vehicle 20.

The frame 24 has a pair of parallel elongate side members 26 extending from the rear toward the front of the vehicle and a cross-member 27 secured between the ends of the members 26 at the front end of the frame. A cross-member 28 is connected between the opposite ends of the members 26 at the rear end of the frame 24 and parallel to the cross-member 27. The rear cross-member 28 has a right-angle extension 30 at each end thereof generally normal to and extending upwardly from the plane of the frame 24, each extension 30 having a transverse leg 32 extending outwardly relative to the members 26 and parallel to the plane of the frame 24. The extensions 30 lower the center of gravity of the vehicle 20. Secured between the cross-members 27 and 28 is a pair of elongate tubular members 34, said members being spaced equally on opposite sides of the longitudinal center line of the frame 24.

The support frame 25 supports the front wheel and steering mechanism of the vehicle. Said frame 25 is comprised of a pair of selectively shaped tubular members 38 and 40 arranged in the same vertical plane substantially perpendicular to the plane of the frame 24. The lower tubular member 38 is S-shaped in configuration, one end 42 thereof being secured to the midpoint of cross-member 27 and its opposite end being secured adjacent the lower extremity of the vertically arranged, hollow open-ended standard or sleeve 44. A pair of horizontally disposed tubular foot support members 46 are secured on diametrically opposite surfaces of the member 38 spaced forwardly of the cross-member 27. The upper member 40 has an obtuse angle bend 48 therein opening downwardly toward the member 38, one end of said member 40 being secured to the standard or sleeve 44 adjacent the upper extremity thereof and the opposite end 50 being secured, as by welding, between the members 34 and immediately behind the front cross-member 27. Thus, the frame 25 is arranged in a vertical plane substantially aligned with the longitudinal center line of the frame 24 and extending forwardly and upwardly relative to the frame 24.

The motor 52 is mounted on frame 24 by means of the mounting plates 53 bolted together straddling the members 34, the mounting plates 53 being adjustable in position along the length of the members 34 to permit selective movement of the motor to best advantage. Of course, one of the plates 53 is secured directly to the housing of motor 52. Motor 52 comprises a conventional internal combustion engine which preferably is four-cycle model for desirable torque development and ease of maintenance and operation, and which may rate from 1¾ to 3¾ horsepower. A gasoline tank 54 conveniently is secured to the top of the motor such as by strap 56 (FIGS. 1 and 2), it being noted that the tank 54 preferably, does not protrude above the top end of the motor 52. A small compact muffler 58 is secured over the exhaust outlet of the motor for achieving suitable silencing of exhaust noise during operation. Because the motor 52 is of conventional, readily available construction, a full detailed description thereof is unnecessary, however, other component parts which have been illustrated are the air filter 60 (FIG. 4), the recoil starter assembly 62 (FIG. 4) which includes a starter cord (not shown). Of course, it is feasible to employ a conventional self-starter mechanism in place of the recoil starter assembly 62.

Supported on the upper end of the motor 52 is a seat 64 of the well-known bucket type. However, the seat 64 is mounted for pivotal movement about the pin 65 so that same can be moved to the dotted line position 66 seen in FIG. 1 where the seat is displaced from the upper end of the motor to permit access to the tank 54 as well as other portions of the vehicle for service and repair purposes. It will be noted that in the dotted-line position 66, the seat 64 is closer to the frame 24. This will further assist in storage of the vehicle in a small volume of space such as the trunk of any automobile and permit the trunk door to be closed.

The drive shaft of the motor is connected through a clutch assembly 70 to the drive pinion 72. Preferably, the clutch 70 is of the centrifugal type which engages when the drive shaft of motor 52 attains a predetermined speed of revolution and automatically disengages when said drive shaft is rotating at less than said predetermined angular speed. Such an arrangement eliminates the need for any clutch controls for the operator to manipulate in addition to the braking mechanism and accelerator mechanism or throttle of the motorized vehicle. Referring to FIG. 5, drive pinion 72 is connected by means of the sprocket chain 74 to a sprocket wheel 76 keyed on the shaft 78.

As noted from FIGS. 4 and 5, the shaft 78 is journalled at its opposite ends in suitable bearings 80 provided in the upstanding plates 82. Each plate 82 is bolted to a mounting bracket 84 secured upright on a member 26 and as seen in FIG. 3, each mounting bracket 84 may have transversely extending slots 86 for receiving the bolts 88 therethrough so that the plate 82 is movable in a direction parallel to the member 26 upon which it is secured. The bearings 80 are located spaced above the plane of the frame 24 and the shaft 78 likewise is so spaced and is parallel to the plane of the frame 24. Shaft 78 is rotatable with the sprocket 76.

The shaft 78 has its ends 90 protruding outwardly of bearing 80 respectively, said ends 90 each having a pinion 92 secured thereto for rotation with the shaft 78. Each pinion 92 is connected by a sprocket chain 94 to a sprocket 96 journalled on the horizontal leg 32 of an extension 30. Each sprocket 96 is suitably joined by bolts 97 extending through housing 102 to drive one of the rear wheels 98 suitably journalled on the leg portion 32. This arrangement is readily available on the market. The rear wheels each mount pneumatic or semi-pneumatic tires.

Although not specifically shown, the shaft 78 may have its ends terminating on the interior of the bearings 80 respectively and said ends each connected to a pivoted gear on the interior of a bearing 80. Then, protruding portions 90 carrying pinions 92 could be connected to the pivot gears for achieving a differential system. This differential system would cause the inside rear wheel of the vehicle 20 when turning to "mark time" or slip and thereby avoid whipping of the vehicle when turning.

The sprockets or gears 92 and 96 are selected to provide suitable gear reduction for the wheels 98, this being accomplished by proper selection of the ratio of the diameters and number of gear teeth on the gears 92 and 96 respectively. The desired gear reduction ratio can be varied easily in view of the ready access available to the sprockets or gears 92 and 96. Also, it may be noted that the precise manner of connecting the gear 96 to a wheel 98 may vary from that shown.

The vehicle 20 has only a single front wheel 104 mounting a pneumatic or semi-pneumatic tire 106. The wheel 104 is journalled in a suitable yoke 108 which includes a standard or tube (not shown) received in the sleeve 44 through the bottom end thereof and held in place by the clamp ring 110. Mounted on the upper end of the sleeve 44 is a collar 112 having a thumb screw 114 threaded thereinto. The steering mechanism 116 of the vehicle comprises a conventional handle bar device having a tubular column 118 which is inserted into the sleeve 44 through the collar 112 and fastened in position by means of the thumb screw 114. The height of the steering mechanism can be adjusted by loosening the screw 114 and raising or lowering the handle bars 116, as desired and then, retightening the screw 114.

Referring to FIG. 2, the control lever 120 is situated to be operated from the hand grip 122 at one end of the handle bar 116. The control lever 124 is situated to be operated from the hand grip 126 at the opposite end of the device 116. Said control levers 120 and 124 are connected to the flexible cables 128 and 130 respectively supported from the handle bar by the clamps 132. Said control levers 120 and 124 are for controlling respectively acceleration of the vehicle and a braking mechanism (not shown) operably associated with the front wheel 104.

As explained, the vehicle 20 is especially suitable for use as a golf cart. As seen in FIGS. 4 and 6, means are provided at the rear of the vehicle for securing a golf bag on the cart. Said means comprise a plate 131 secured on the frame 24 and extending outwardly of the cross-member 28. Also secured on the cross-member 28 aligned with the plate 131 is an upstanding pin 135 having a lug 134 adjacent the bottom end thereof. A tube or hollow column 136 is adapted to be telescopically engaged with the pin 135 in an upright position and prevented from undesirable rotation by means of a cooperating element (not shown) adapted to engage the lug 134. The tube or column 136 may be provided with an arcuate-shaped bracket (not shown) for receiving a golf bag therein, the gold bag being supported upright on plate 131 and secured by familiar straps thereon.

The column or tube 136 is removable readily from the vehicle and hence, the pin 135 can serve other functions, as well. For instance, as seen in FIG. 1, a wagon shown in phantom outline 138 can be secured to the cart 20 by attaching the wagon tongue 140 to the pin 135 by means of any conventional hitch device. Other devices can be hitched to the cart for other uses thereof, such as a lawn mower or other type of gardening equipment to be towed by the cart 20. The cart 20 is suitably dimensioned so as to permit same to be used conveniently and safely by home owners about their properties.

In order best to appreciate the achievement represented by the motor vehicle 20, some statistical information concerning a successful embodiment of the vehicle 20 follows:

| | |
|---|---|
| Overall length | Approx. 40 inches. |
| Overall width | Approx. 29 inches. |
| Maximum height at handlebars 116 | Approx. 26 inches. |
| Maximum height at seat 64 | Approx. 18 inches. |
| Total weight | Less than 75 lbs. |
| Gasoline engine | 2½ horsepower. |

The steering mechanism of the vehicle 20 is removable from the chassis frame to permit storage of the vehicle in the trunk compartment of a conventional stock car, such as made by General Motors Corporation, Ford Motor Corporation, etc. and in many of the so-called compact automobiles made by the same automobile manufacturing companies. The vehicle 20 was provided with a drive mechanism which permitted a maximum vehicular speed of about 25 miles per hour, although variation in speed of travel permitted for the vehicle can be attained either to achieve more or less than the stated 25 miles per hour. The vehicle 20 was highly stable and capable of traversing grades up to 45 degrees fully loaded without overturning. Modification of the vehicle 20 illustrated to carry more than one passenger is feasible.

Several reasons for achieving the highly stable character of the vehicle 20 are believed to be as follows: A very low center of gravity for the vehicle was achieved by means of the frames 24 and 25 and the extensions 30 elevated above frame 24. The axes of rotation of the wheels are spaced above the plane of frame 24. Most of the weight was supported on the rear frame 24 suitably centered with respect thereto. The vehicle was sloped downwardly toward its front end by using a wheel 104 which was smaller in diameter than the rear wheels. For instance, the front wheel 104 was approximately 15 inches in diameter whereas an 18 inch diameter rear wheel 98 was used. A spread of approximately 28½ inches between the rear wheels 98 was provided. As a result, the vehicle 20 was wide and low in configuration with a very low center of gravity contributing to stability desired for traversing steep grades. All the structural members were secured together and the vehicle parts assembled to withstand approximately 500 lbs. centered at approximately the midpoint of the seat 64.

It is believed the invention has been described in sufficient detail to enable the skilled artisan to understand and practice the same. In the claims appended hereto, the language employed is intended to be broadly and liberally construed commensurate with the stature of the invention.

I claim:

1. In a motorized golf cart of the character described, having a pair of driven rear wheels and a front wheel, a chassis comprising, a first tubular metal frame having a substantially rectangular, open configuration and front and rear ends arranged substantially horizontally, a second tubular metal frame comprised of a pair of elongated members each having a bend intermediate the ends thereof, said members being spaced one above the other in a plane perpendicular to the plane of the first frame and each having one end thereof rigidly secured to the front end of the first frame at a juncture co-planar with said first frame with said second frame in alignment with the longitudinal center line of the first frame and extending forwardly and upwardly relative to said front end, said second frame having means secured to the respective other ends of said members for mounting said front wheel and a steering mechanism therefor, said first frame having extensions adjacent the rear end thereof for mounting said rear wheels with their axes of rotations parallel with and spaced above the plane of the first frame.

2. In a motorized golf cart of the character described, having a pair of driven rear wheels and a front wheel, a chassis comprising, a first tubular metal frame having a substantially rectangular, open configuration and front and rear ends arranged substantially horizontally, a second tubular metal frame comprised of a pair of elongated members each having a bend intermediate the ends thereof, said members being spaced one above the other in a plane perpendicular to the plane of the first frame and each having one end thereof rigidly secured to the front end of the first frame at a juncture co-planar with said first frame with said second frame in alignment with the longitudinal center line of the first frame and extending forwardly and upwardly relative to said front end, said second frame having means secured to the respective other ends of said members for mounting said front wheel and a steering mechanism therefor, said first frame having extensions adjacent the rear end thereof for mounting said rear wheels with their axes of rotations parallel with and spaced above the plane of the first frame, said first frame having a pair of parallel members secured between said front and rear ends and equally spaced on opposite sides of the longitudinal center line of the first frame for mounting a motor for the cart.

3. In a motorized golf cart of the character described, having a pair of dirven rear wheels and a front wheel, a chassis comprising, a first tubular metal frame having a substantially rectangular, open configuration and front and rear ends arranged substantially horizontally, a second tubular metal frame comprised of a pair of elongated members each having a bend intermediate the ends thereof, said members being spaced one above the other in a plane perpendicular to the plane of the first frame and each having one end thereof rigidly secured to the front end of the first frame at a juncture co-planar with said first frame with said second frame in alignment with the longitudinal center line of the first frame and extending forwardly and upwardly relative to said front end, said second frame having means secured to the respective other ends of said members for mounting said front wheel and a steering mechanism therefor, said first frame having extensions adjacent the rear end thereof for mounting said rear wheels with their axes of rotations parallel with and spaced above the plane of the first frame, and a pair of upstanding bearing plates secured on said first frame in closer proximity to said rear end and adapted to have a shaft journalled at opposite ends thereof in said bearing plates spaced above the first frame for driving said rear wheels.

References Cited in the file of this patent

UNITED STATES PATENTS

| | | |
|---|---|---|
| 898,481 | Johnson | Sept. 15, 1908 |
| 2,493,287 | Hatfield | Jan. 3, 1950 |
| 2,749,997 | Deslippe | June 12, 1956 |
| 2,815,222 | Harrison | Dec. 3, 1957 |
| 2,862,569 | Strunk | Dec. 2, 1958 |
| 2,895,279 | Shrage | July 21, 1959 |
| 2,919,758 | Newton et al. | Jan. 5, 1960 |